April 23, 1968
W. C. COOPER ET AL
3,379,048
HOT BILLET LOADER
Filed Dec. 27, 1965
7 Sheets-Sheet 3
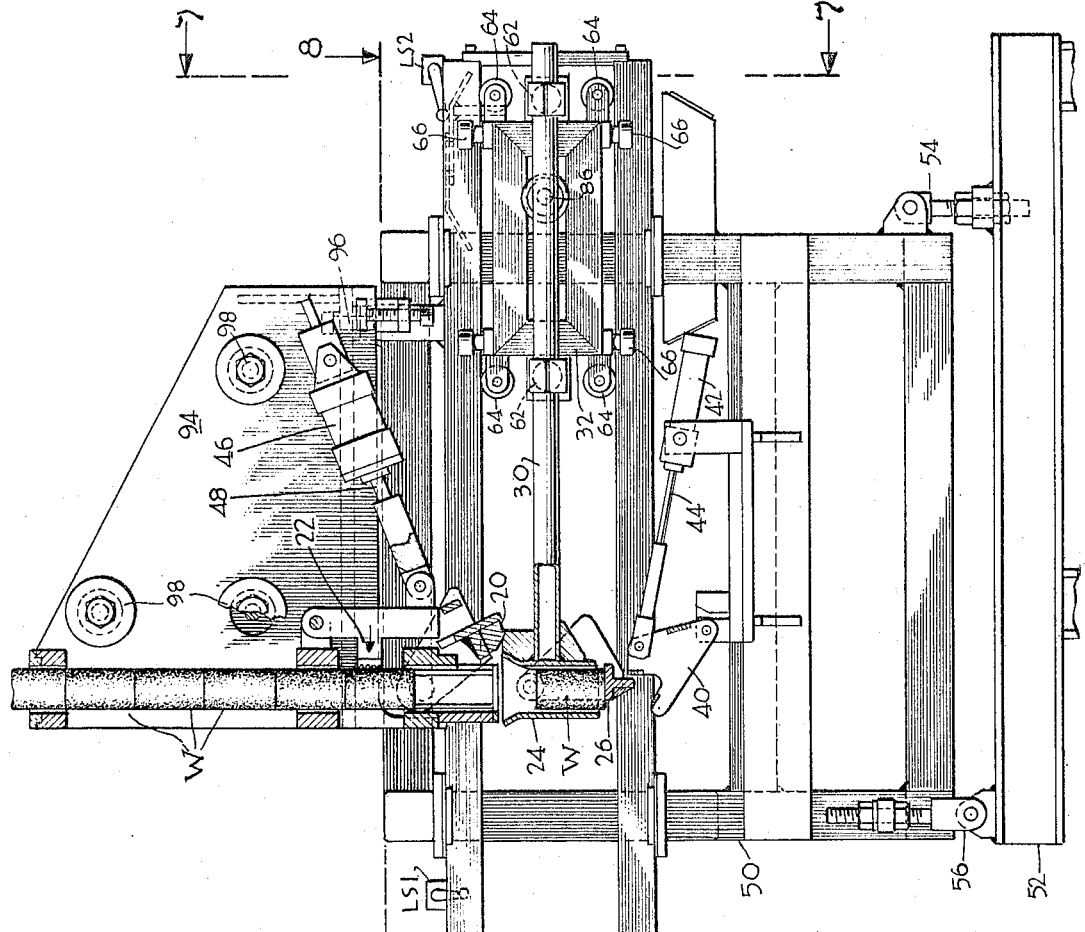
FIG. 3
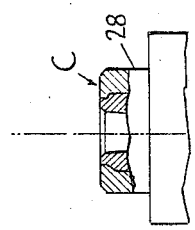
INVENTORS
William C. Cooper
Harvey J. Nelson
BY
ATTORNEY

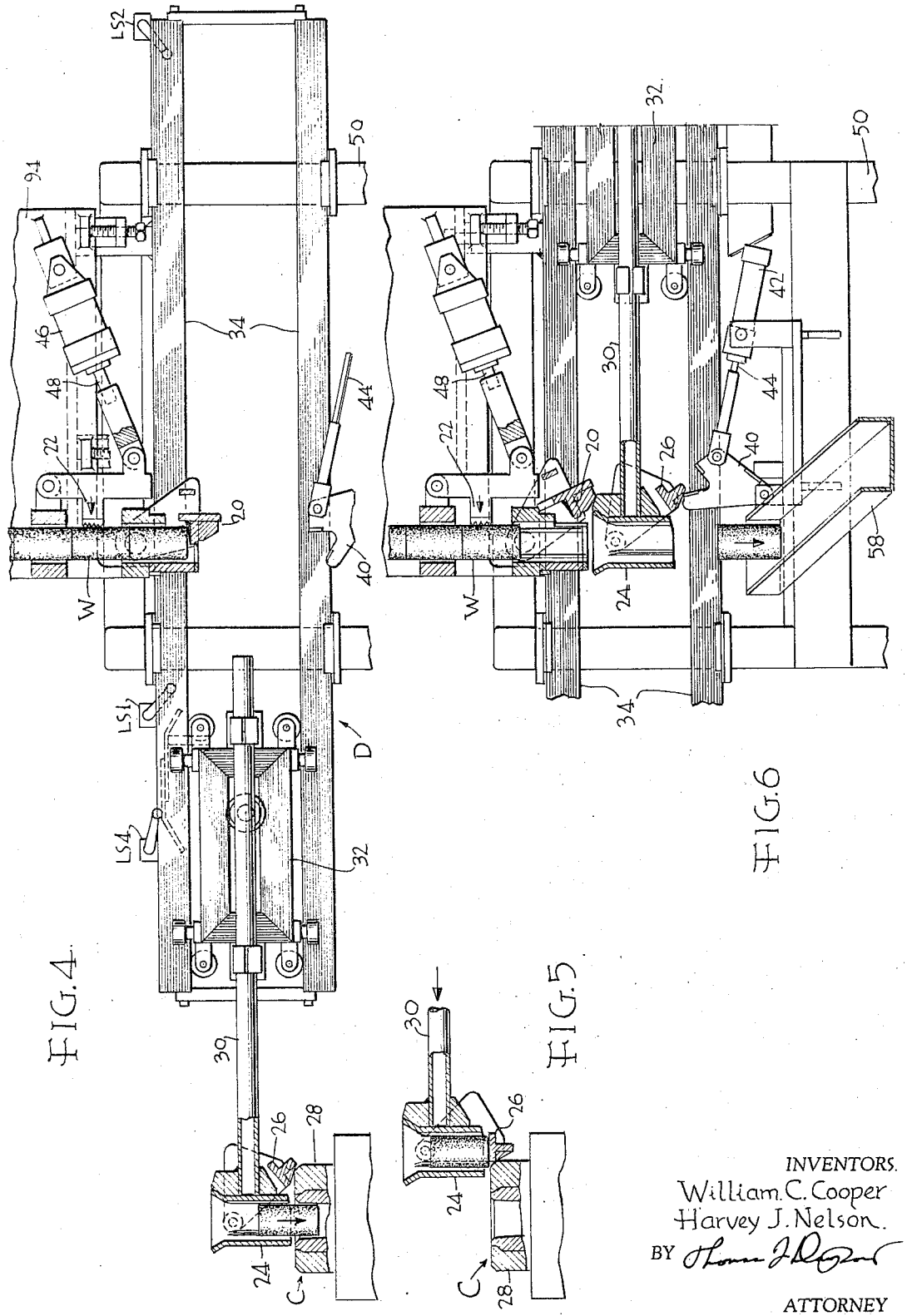

April 23, 1968

W. C. COOPER ET AL 3,379,048

HOT BILLET LOADER

Filed Dec. 27, 1965

INVENTORS.
William C. Cooper
Harvey J. Nelson
ATTORNEY

April 23, 1968 W. C. COOPER ET AL 3,379,048
HOT BILLET LOADER

Filed Dec. 27, 1965 7 Sheets-Sheet 6

INVENTORS
William C. Cooper
Harvey J. Nelson

ATTORNEY

United States Patent Office 3,379,048
Patented Apr. 23, 1968

3,379,048
HOT BILLET LOADER
William C. Cooper, Royal Oak, and Harvey J. Nelson, Warren, Mich., assignors to The Budd Company, Philadelphia, Pa., a corporation of Pennsylvania
Filed Dec. 27, 1965, Ser. No. 516,254
10 Claims. (Cl. 72—419)

This invention relates to apparatus for feeding hot billets, as to the containers of a hot-forming press, and has for an object the provision of improvements in this art.

One of the particular objects of the invention is to provide billet feeding means which is substantially automatic in action for one cycle for feeding hot billets to a high speed press as fast as it can handle them and as fast as they can be delivered from a heating furnace.

Another object is to provide a billet carrier or transfer device, such as a billet-holding cup, and appurtenances which will automatically take off a billet from a feed chute while the following billets in the chute are held back when the transfer device reaches the dispensing end of the chute—referred to as the back or home position of the transfer device.

Another object is to provide a billet transfer device which will automatically drop a billet into the press container when the transfer device reaches the container.

Another object is to provide means for dumping billets from the supply chute through the billet transfer device when billet feeding conditions are not right or when operations are to be halted for any reason.

Another object is to provide improved means for supporting and moving the transfer device.

Another object is to provide suitable safety controls to avoid malfunctioning or damage.

The above and other objects of the invention, as well as various features of novelty and advantages, will be apparent from the following description of an exemplary embodiment thereof; reference being made to the accompanying drawings, wherein:

FIG. 3 is an enlarged longitudinal vertical section and elevation taken on the line 3—3 of FIG. 2;

FIG. 4 is a view like FIG. 3, but with some parts omitted, and showing a billet being deposited in a press container;

FIG. 5 is a view like the left side of FIG. 4, but showing the billet carrier or cup at the time it reaches the front side of the container;

FIG. 6 is a view like the right side of FIG. 3, but showing the position of parts for dumping all of the billets from the chute leading from the billet heating furnace;

FIG. 10 is a view like the upper part of FIG. 1, with certain parts omitted;

FIG. 11 is a plan view of the parts shown in FIG. 10.

The apparatus illustrated herein comprises the following main units:

(1) A billet heater such as an electric furnace, designated A with billets being pushed through in a horizontal line;

(2) A feed chute B for conveying hot billets or workpieces W from the heater to a dispensing and transfer pick-up station;

(3) A billet receiving unit C (only positionally indicated) such as a billet forming press, having a billet receiving container and a die operating ram, a "maxi-press," for example, which is well known in the art;

(4) Billet feeding or transfer mechanism D with which the present invention is principally concerned, for feeding billets from the chute to the container.

General arrangement and action

Figure 8:
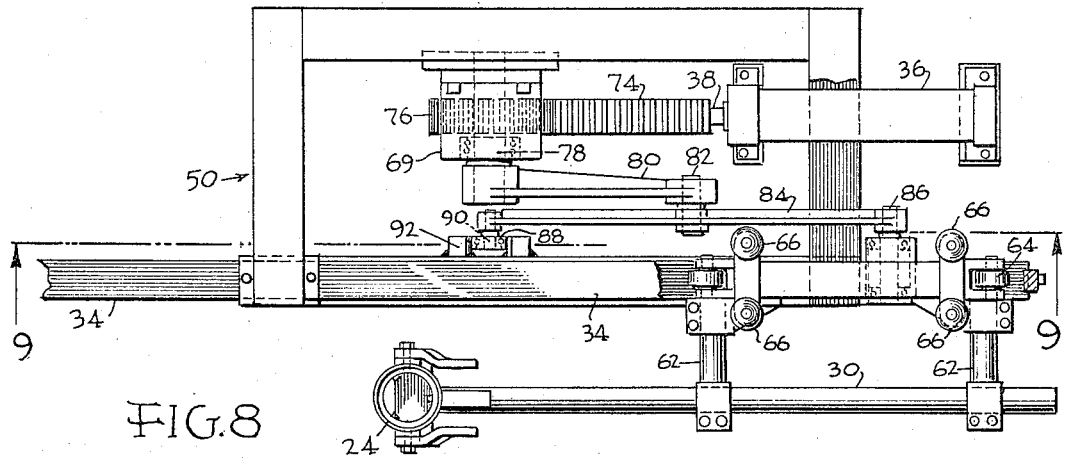
FIG. 8 is a transverse horizontal section taken on the line 8—8 of FIG. 3.
Figure 9:
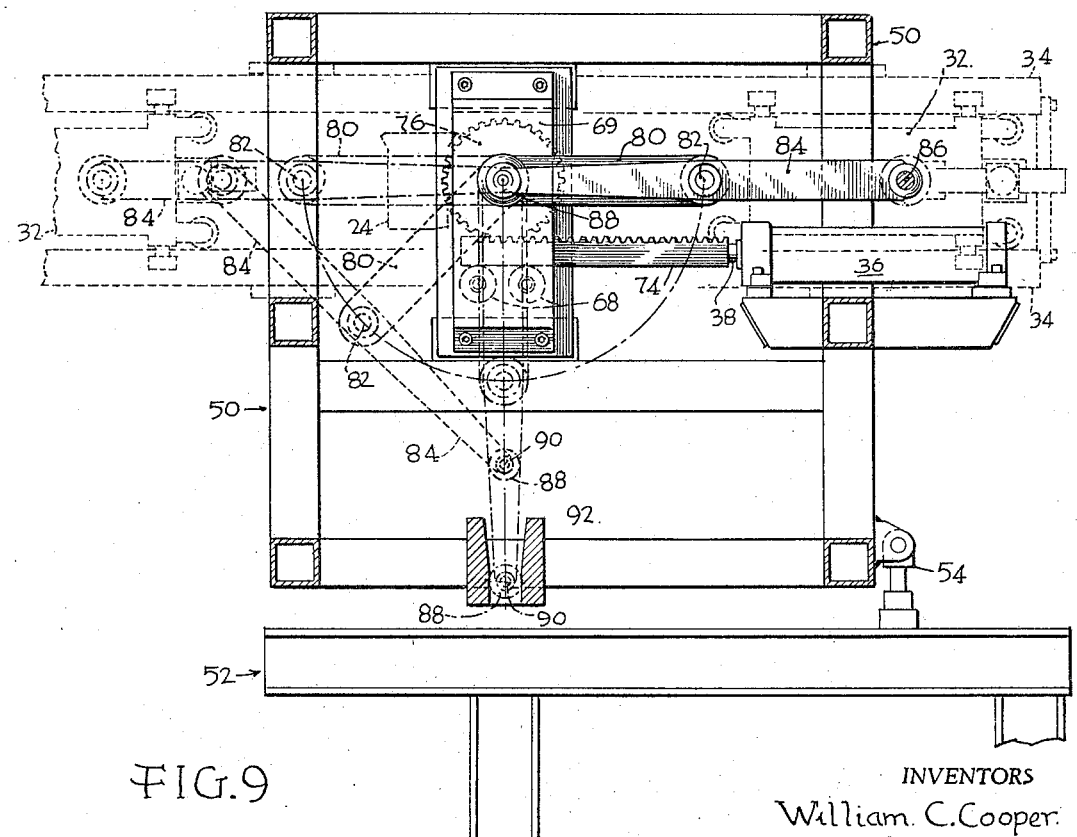
FIG. 9 is a vertical longitudinal section taken on the line 9—9 of FIG. 8.
Figure 12:
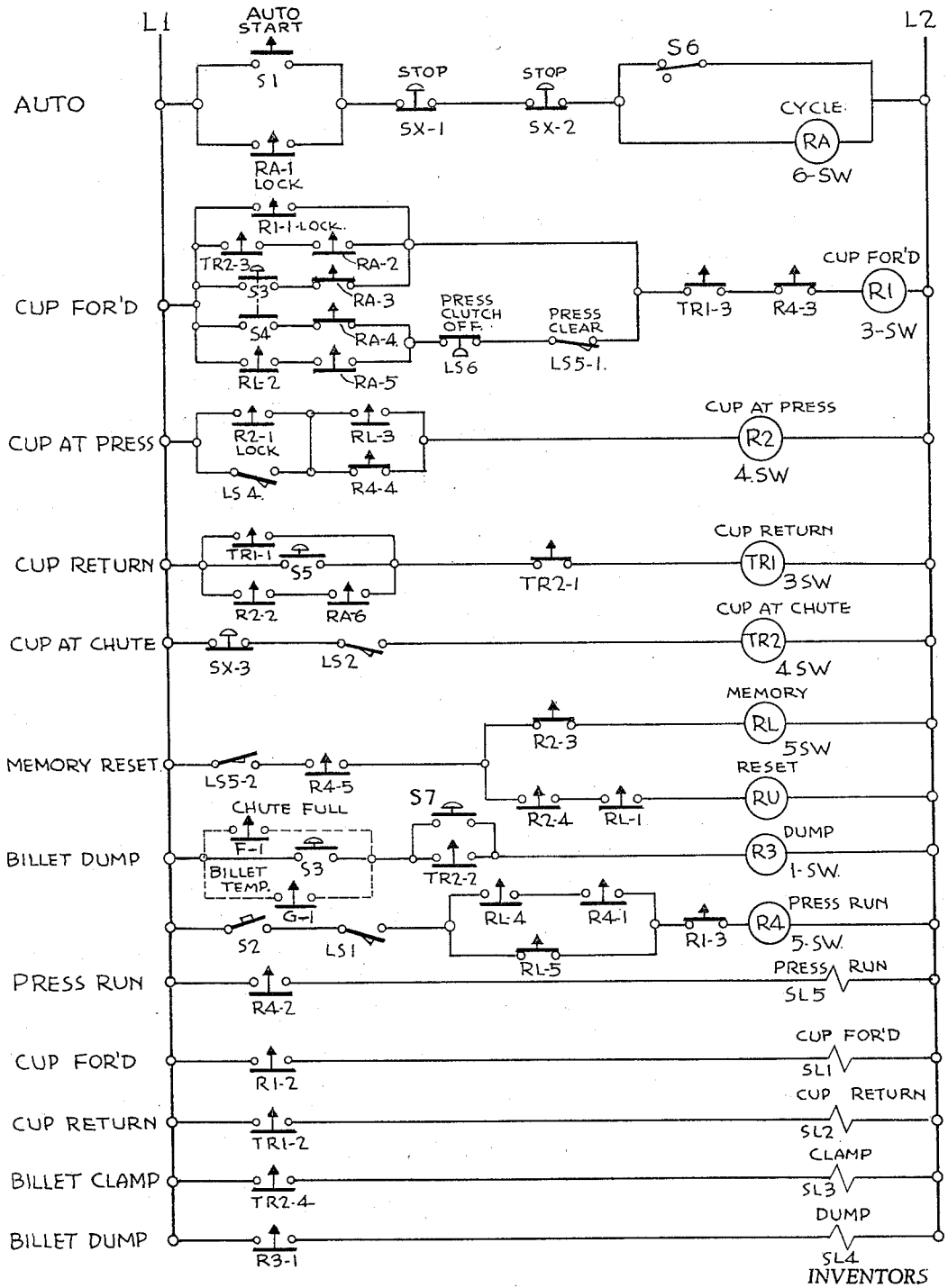
FIG. 12 is a wiring diagram.

Assuming that all units are functioning and set for a cycle of automatic operation, the action for one cycle is as follows:

There will be one or more billets W of proper size and temperature near the dispensing end of the chute B which, at the lower end, is provided with a swingable gravity-closed billet-holding bottom closure 20 and thereabove with a billet clamp 22 for holding back following billets when the bottom billet is fed into a transfer cup 24 of the feeding or transfer mechanism. Means, such an electronic beam detector F (FIG. 1) may be provided for assuring that there is a supply, and not an over-supply, of billets in the chute; means, such as a heat detector G (FIGS. 2 and 8) may be provided for assuring that they are at the proper temperature. However, an operator can readily attend to these precautions and such means themselves are well known so, for simplicity, the details of such means are omitted from the present disclosure, merely the locational presence being indicated.

The back or home position of the billet transfer cup is below the bottom end of the chute where it automatically opens the closure 20 of the chute to cause the lowermost billet W to drop into the cup and rest upon its swingable gravity-closed bottom closure 26. The clamp 22 will be activated for clamping at this time to hold up the line of billets in the chute above the one fed out. This actuation of the clamp could be manual but, for safety, a limit switch LS2 is provided, shown in FIG. 1, as being operated by the carriage, although it could be operated by other related means. Clamping is effected through a time-delay (delay-off) relay TR2 to assure that the line of billets in the chute will be held up after the cup moves away to allow the chute bottom closure 20 to fully reclose the lower end of the chute to hold up the line of billets when released by the clamp.

Hand operation of a switch S1 (shown in the wiring diagram) is required to cause the cup to move forward on an automatic one-stroke cycle; but even this cannot produce a feeding cycle if the press has not completed its action upon a previously fed billet and moved the ram and die to the off position clear of the billet-receiving container 28. A limit switch LS5 (see wiring diagram) is provided for this.

The cut 24 is mounted, as on a rigid projecting bar 30, carried by a reciprocatory carriage 32 operating on a trackway 34. Means, generally designated by the letter E (FIG. 2 and FIGS. 7–9) are provided for reciprocating the carriage and cup; but the particular reciprocating means used is not a part of the present invention.

It is important to avoid sudden abrupt starts and stops at the ends of the stroke for preventing injury or breakage of the interengaging parts which are provided; and for this purpose end-cushioning means, harmonic motion means, or other suitable means could be provided, harmonic motion means being used herein, as will be explained.

It is also important, when space is small, to avoid space-consuming power reciprocating means; and for this purpose stroke-increasing means is provided between a power actuating device 36, here shown as a reciprocatory cylinder piston device with a power piston rod 38 (FIG. 9), and the carriage. The carriage drive mechanism will be described later.

When the press is in readiness for a billet to be deposited in its container, as registered by interlocking controls to be described; when other parts of the equipment are in readiness; and when the operator closes the switch S1; the carriage and cup with a billet therein will be moved out or forward until the bottom closure 26 of the cup engages an operating element at the container 28 to open the cup closure 26 and drop the billet into the container.

When the carriage is in the full forward position for the cup to deposit a billet in the container, a limit switch LS4 along the track is operated to initiate the return of the carriage.

Means are provided, as by a time delay device TR1, to be described later, to assure that the cup remains in its forward position for a sufficient length of time for the billet to be properly deposited in the container.

Means are provided, as by a limit switch LS1 along the trackway and operated by the carriage when the cup has moved back a safe distance from the press container, for authorizing the operation of the press. Only return movement of the carriage controls the switch. However, the press still cannot be cycled until the operator closes a foot (or hand) switch S2 at the press.

*Billet dumping*

The above description covers the normal action. If for any reason, such as the presence of too many billets in the chute, or billets which are too cold to forge (say 1850° F. if the optimum forging temperature is about 2200° F.), or if the press is shut down, or for any other reason, it is desired to dump billets from the chute, this can be accomplished when the cup is located below the lower end of the chute and is holding the chute closure 20 open. It may be effected by opening the cup closure 26 and releasing the clamp 22. If both the clamp and the cup closure free the line of billets at once and for a sufficient length of time, all billets will be dumped; if they dump and release billets in aternation, the lower billets will be dumped one-by-one. The circuit, to be described, is designed to drop them in alternation.

Referring to FIG. 6, the cup closure 26 may be operated when the cup is in home position by causing a swinging closure operator 40 to engage the closure and swing it open, the closure operator being actuated by suitable power means, such as a cylinder-piston dump motor 42 connected through a rod 44 and actuated by closing a normally open hand switch S3. The clamp 22, which is normally energized to clamp a billet when the cup is in the home position, is de-energized to release billets by opening a normally closed hand switch SX-3. The clamp control is through its power actuating device, specifically, as shown, by the fluid cylinder-piston device 46 and its connecting rod 48.

*Structure*

The transfer mechanism is supported, along with a lower end of the chute unit B, by a frame 50 which is mounted for adjustment on a main base frame 52, as by a verticallly adjustable hinge support 54 at one side and by a tilting adjustment support 56 at the other side. This provides for varying the elevation of the billet cup when it reaches the press container.

A dump chute 58 and a dump box 60 for discarded billets—for reheating or other disposition—are provided below the end of the billet supply chute and the home position of the cup.

The cup-supporting bar 30 is mounted on the carriage 32 by lateral mounting bars 62 carried on the front side of the carriage. The rails of the trackway 34 are spaced apart vertically by a considerable distance and the carriage is supported on the trackway by a plurality of vertical guide rolls 64 and a plurality of lateral guide rolls 66.

*Carriage operating means*

The carriage reciprocating means (FIGS. 6–9) comprises the main reciprocating power device in the form of the fluid cylinder-piston motor 36 having the piston rod 38. The piston rod carries a toothed rack 74 which engages a gear 76 on a crank shaft 78 mounted for rotation in suitable bearings. The rack is guided and held against the gear by rolls 68 carried by a frame 69 mounted on the frame 50.

The crank shaft 78 carries a crank 80 with a crank pin 82 which is connected to the carriage by a distance-increasing means which moves the carriage twice the distance of the crank pin. As shown, the crank pin 82 is connected to the mid-length of a coating lever 84 which is connected at its outer end to the carriage, as by a pivot pin 86, and which at its other end is connected to a control roll 88, as by a pivot pin 90, the control roll 88 operating at mid-thrown position in a reversing guide 92 disposed along a line at right angles to the direction of travel of the carriage and passing through the axis of rotation. This harmonic travel-increasing mechanism serves the purposes of the present invention; but it is well known per se and needs no further description. It is sufficient to know that as the rack moves out it turns the crank 180 degrees to move the carriage twice the throw of the crankpin, and as the rack moves back the motion is repeated in reverse.

The chute B is mounted at its lower end on a frame 94 carried by the frame 50, means, such as the securing means 96, being provided for lateral adjustment, and means, such as the securing means 98, being provided for vertical adjustment relative to the transfer cup.

In case billets issuing from the press should stick together, there is provided a power-operated plunger 100 for breaking them apart. The chute at its upper end is supported by a bracket 102 which may be adjustable if needed. The chute is made of spaced bars of a metal having high heat resistance and resistance to bending, such as "Stellite" or the like, and the cup may be lined by spaced vertical bars of the same material.

Figure 1:
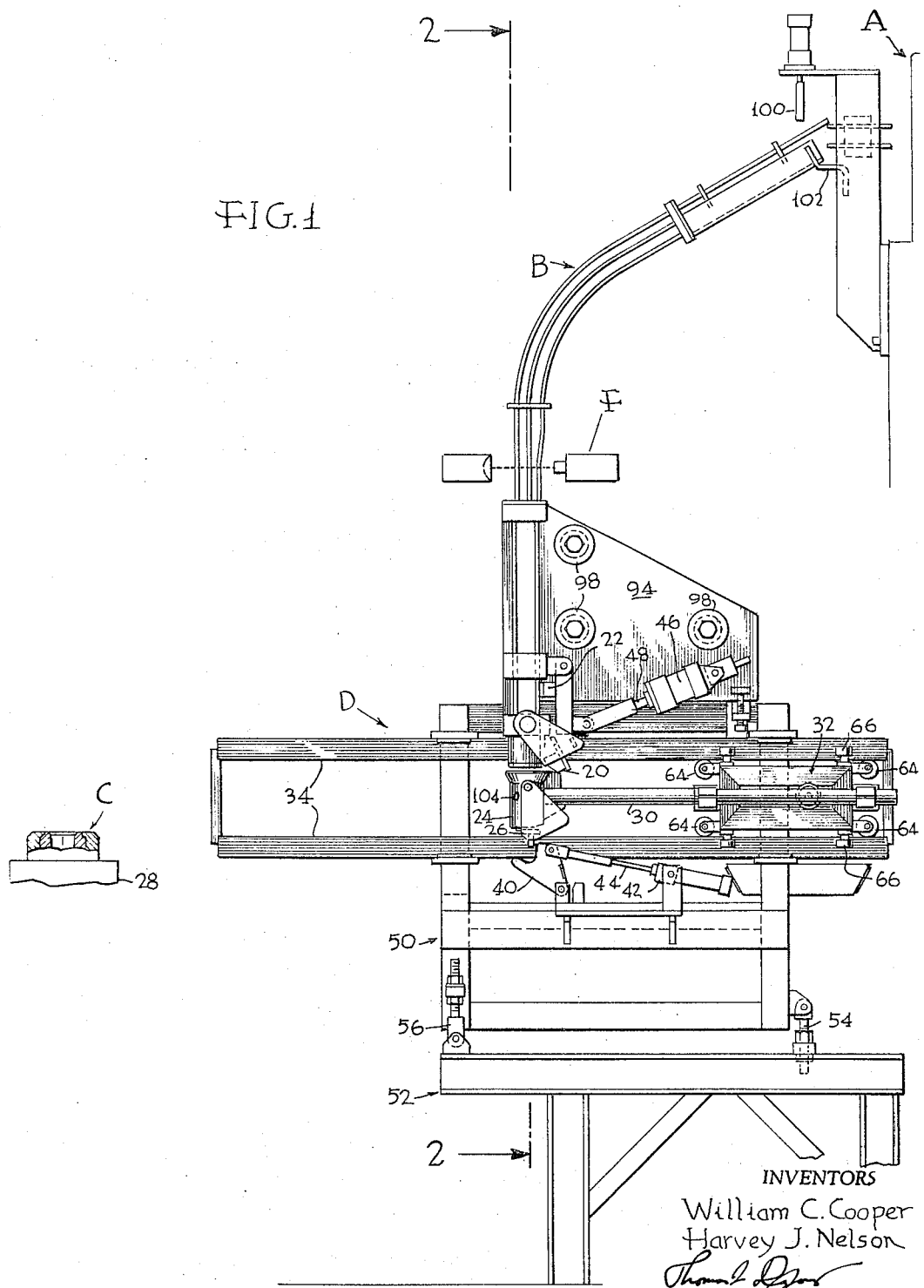
FIG. 1 is a front side elevation of an installation for heating, feeding out, and transferring hot billets to a press container.
Figure 2:
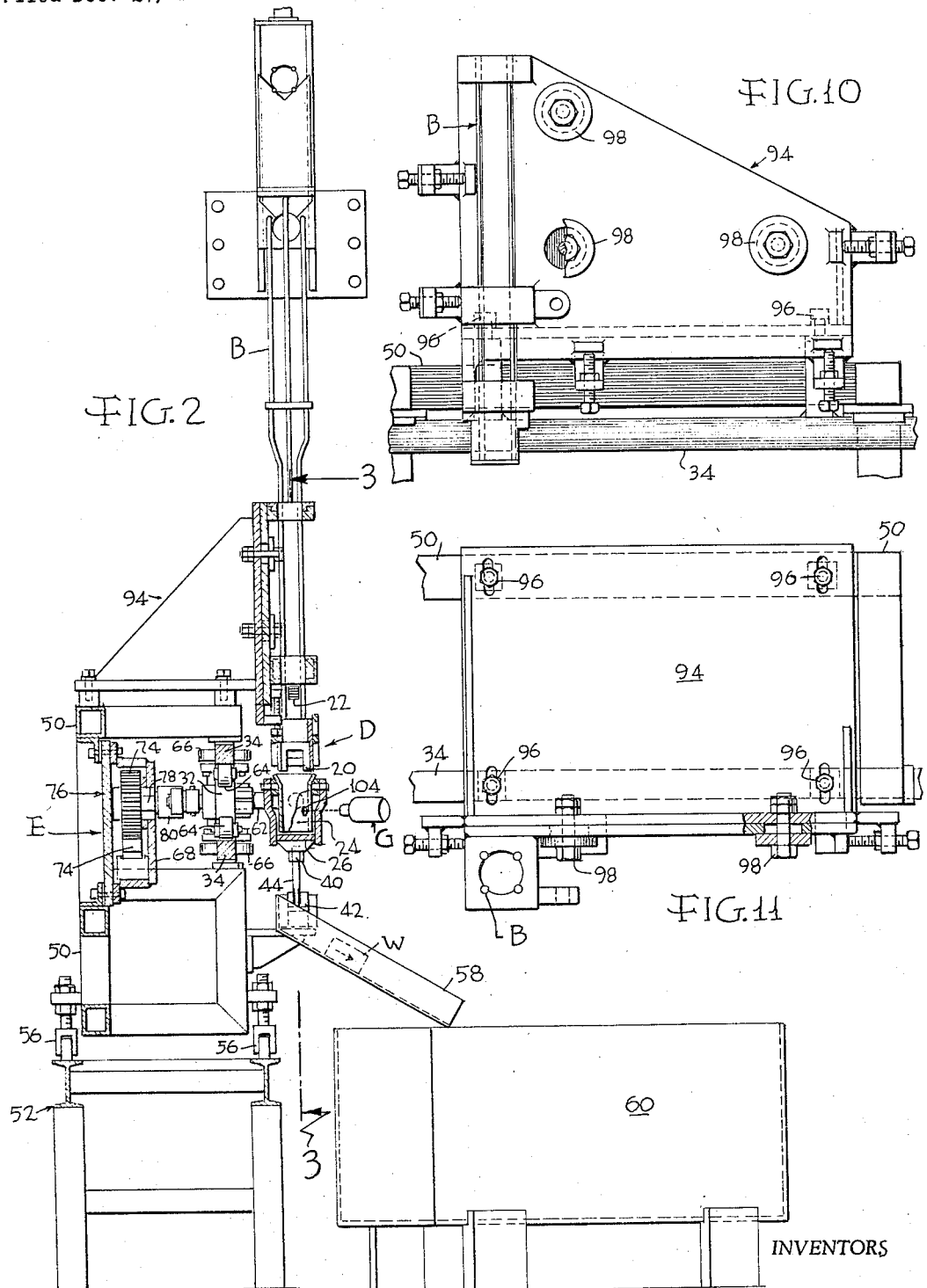
FIG. 2 is a transverse vertical section and elevation of the apparatus shown in FIG. 1, the view taken on the line 2—2 of FIG. 1.
Figure 7:
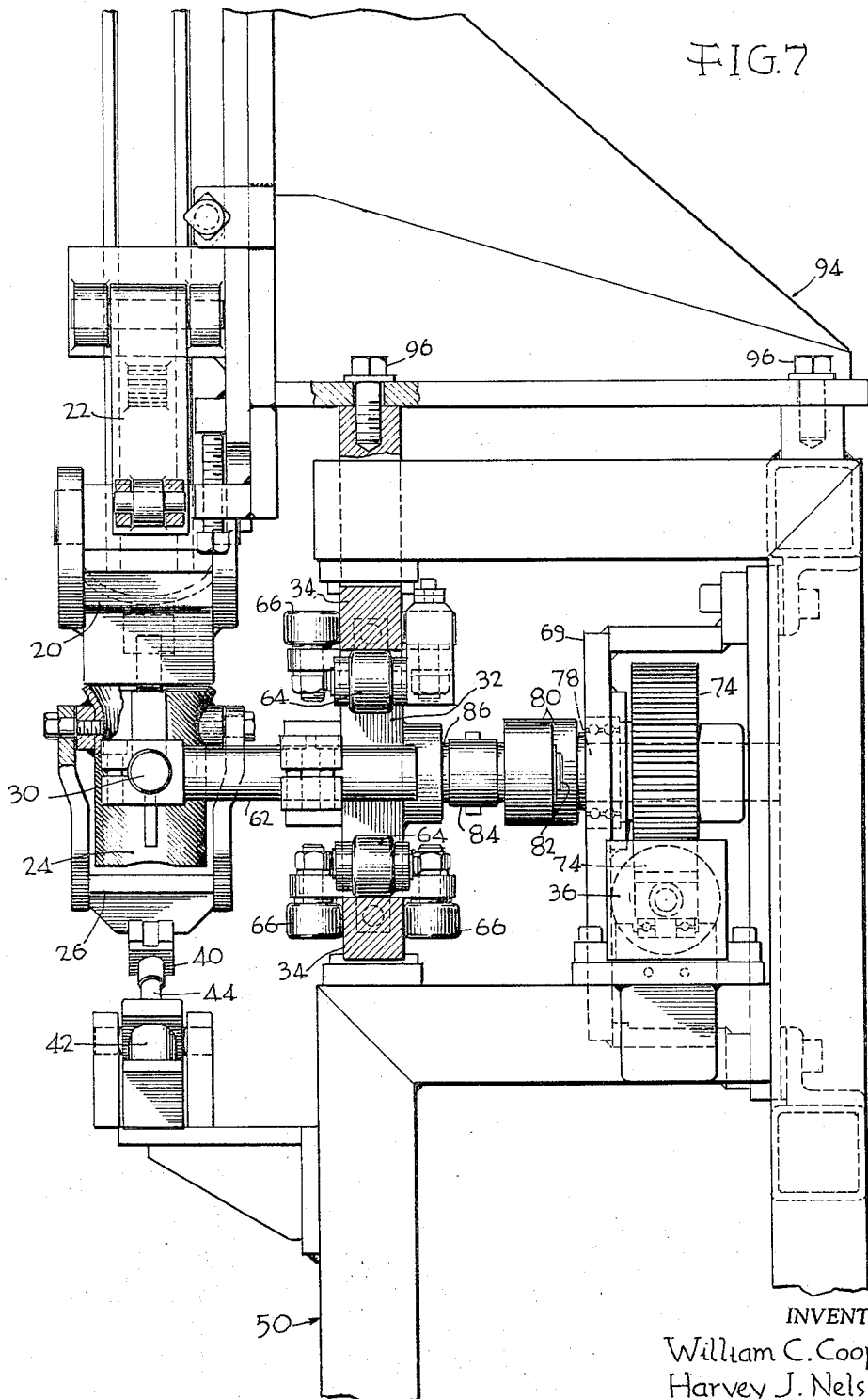
FIG. 7 is an enlarged transverse vertical section taken on the line 7—7 of FIG. 3.

The manner in which the top of the cup 24 opens the bottom closure 20 of the chute is clearly shown in FIGS. 1 and 3; the manner in which the bottom closure 26 of the cup is opened when it strikes the side of the press container 28 is clearly shown in FIGS. 5 and 4, the initial engaging position being shown in FIG. 5 and the fully open position being shown in FIG. 4; and the manner in which the cup closure 26 is opened by the dumping operator 40 is clearly shown in FIGS. 1, 3, and 6.

The clamp 22 in FIG. 3 appears to be pushing a billet toward an open space but it will be understood that the guide rods on the sides are present here to hold the billet and take side thrust of the clamp.

*Operation*

It will be assumed that there is one operator or attendant at the press and one operator or attendant at the billet heating and feeding station; also that the billet carrier or cup 24 is in its home position with a hot billet therein and with the line of billets in the chute held up by the clamp 22. The press ram will be in its retracted position, leaving the container 28 clear to receive a billet.

Cycle start

Referring to the wiring diagram, FIG. 10, the feed operator closes cycle-start switch S1 to energize the coil of cycle relay RA. The relay designations are found on the coil symbol in all cases.

Energization of relay RA locks it in on its switch RA-1. It also closes switches RA-2 and RA-5 and opens switches RA-3 and RA-4 of a relay R1 which controls the forward or feed movement of the carrier or cup. It also closes a switch RA-6 of a relay TR1 which controls the cup return movement.

The feed cycle can be cancelled, aborted, scrubbed (or such term as may be appropriate) by pressing either the stop switch SX-1 at the press or the stop switch SX-2 at the feed station.

For convenience and to simplify illustration, there is placed below each relay symbol a designation of the number of switches which is operates.

Outfeed of cup

Before the feed stroke, controlled by relay R1, can proceed a press-clear or ram-back limit switch LS5-1 must be closed; also a clutch-off switch LS6 must be closed.

A switch TR1-3 of a time-delay relay TR1 (for cup pause before return) and switch R4-3 of a press-run relay R4 will be closed.

The cup is in its home position so that the limit switch LS2, previously mentioned, will be closed to energize a time delay relay TR2 which closes its switch TR2-3 in the circuit of R1 to move the cup forward.

However, if all is not in order, the feed operator can open a switch SX-3 and hold off the feed stroke until it is safe to feed the billet to the press.

The temperature observation device G (of a known form) could readily be incorporated into the feed-safety circuit just described but, for simplicity, it will be assumed that it merely provides a temperature reading for the operator or that he can be depended upon to know temperature by billet color. It is to be noted that the billet actually in the cup and ready to be fed is the one which must be observed; and that a viewing hole 104 or other observation access is provided in the cup for viewing the billet therein. It is stressed that an undercool billet will not forge properly and may break the press; also that an overheated billet will not forge properly. The matter of overheating, however, can be left to the furnace heating controls.

The cup feed relay locks itself in around TR2-3 and RA-2 by closing its lock switch R1-1.

When relay R1 is energized it also closes a switch R1-2 which energizes a solenoid SL1 which controls a forward-feed fluid control valve (not shown) for the feed motor 36.

Ganged hand-run switches S3 and S4 are provided, the first being in series with RA-3 and the second being in series with RA-4 and then with LS6 and LS5-1. Both are in series with cup-return switch TR1-3 and a press-run switch R4-3, both of which must be closed before the relay R1 can be energized. In no situation, while the press ram is away from its fully retracted position, can the billet be fed to the press.

Cup at press

When the cup is at the press, with a press safety switch R4-4 closed, the safety limit switch LS4 is closed to energize a relay R2, the relay R2 locking in on its lock switch R2-1.

Cup return

Energization of relay R2 closes a switch R2-2 of a cup return relay TR1, switch RA-6 being closed and a switch TR2-1 (to be described) being closed. Relay TR1, after a predetermined time delay, locks in on its lock switch TR1-1.

For hand return a hand switch S5 is provided.

Energization of relay TR1, with time delay, closes a switch TR1-2 to energize a solenoid SL2 for a fluid valve (not shown) for activating the motor 36 in the return direction.

It has been explained that this time delay is provided to assure that the billet has had time to enter the container.

Energization of relay TR1 also opens its normally closed switch TR1-3 in the circuit of cup-feed relay R1 to release fluid from the forward feed end of motor 36.

The cup now moves back to its home position. On its way, and when it is a safe distance from the press container, it operates limit switch LS1 which is in the circuit of a press-operating control relay R4 heretofore mentioned.

A normally closed switch R1-3, which had been opened when the cup was moved to feed out a billet, has been re-closed by the de-energization of R1.

A normally closed switch RL-5 of a memory relay RL is closed at this time since RL is not energized. The press operator can now run the press for one cycle by closing the foot switch S2.

Cup at chute

The cup returns to the chute and the limit switch LS2 is closed. This energizes relay TR2, which closes its switch TR2-4 to energize the solenoid SL3 of a fluid valve (not shown) to apply fluid to the motor 46 of the clamp 22 to force it in and hold up the line of billets above the bottom one, that being automatically dropped into the cup. The clamping action continues as long as the cup is at the home station and for a length of time thereafter for which the time delay relay TR2 is set to hold in before becoming de-energized to open TR2-4 and release the clamp to allow the line of billets to drop down on the chute closure 20, the closure automatically reclosing by gravity as soon as the cup moves away from it.

Dump billets

To dump billets, the hand switch S3 in the line to relay R3 is closed to energize the relay. The switch TR2-2 in the line will be closed at this time, the cup being in the home position. Energization of relay R3 will close its switch R3-1 to energize a solenoid SL4 which controls the fluid valve (not shown) for the dump motor 42 to apply power to it and open the bottom closure of the cup, in the manner described, to drop the billet out of the container.

The operator then opens the switch SX-3 to open the clamp. This results in the closing of the closure at the bottom of the cup and the drop of the line of billets down upon the cup closure. The next dumping action will now drop out two billets below the one held by the re-energized clamp; and this action can be continued until all billets in the chute, or as many as desired, have been dumped.

If all of the billets in the chute are not discharged and if there is a billet resting on the one in the cup, the dump action is repeated without again releasing the clamp. Then the cup is run out and back on an idle trip. This will permit the chute closure to close to hold a billet and cause the clamp to release a billet down upon it. On the return of the cup, normal operation is restored. The same would be the case if only the one billet in the cup is to be dumped.

A full stroke out and back is not required. By opening either SX-1 or SX-2, after S1 has been closed to start a cycle, the outward movement can be halted after the chute closure has closed and received a billet; and by closing a switch S5 the cup will be returned to the chute to pick up another billet.

*Press run*

The energization of this press-run relay R4 has been described. When it is energized it closes its switch R4–2 to close and energize a press-run solenoid SL5 and operate the press through whatever control means may be provided.

The press-run relay R4 locks in on its lock switch R4–1 which is in series with a switch RL–4 of switch R4–5 in the circuit of RL.

If the electronic billet stack-height detector F is used, its action when the stack is too high (at whatever height it may be placed) may be registered in the dump circuit of relay R3 by the closure of a switch F–1; or if the heat detector G is used, it will close a switch G–1 in the same circuit. The switches F–1 and G–1 are in parallel with hand switch S3 (as shown in broken lines) and have the same action as S3.

*Memory-reset*

When the press ram leaves its off position it allows limit switch LS5–1 to open in the cup-forward circuit of R1 so that another safety precaution is provided against the billet being fed out while the press is running. The press clutch-off limit switch LS6 is also opened. The press-run relay switch R4–3 and the cup return relay switch TR1–3 should also be open.

As the press leaves the off position it allows limit switch LS5–2 to close; and since the switch R4–5 of press-run relay R4 has been closed and switch R2–3 of cup-at-press relay R2 has been closed the memory circuit relay RL is energized.

Relay RL, when energized, will close a switch RL–1 in the parallel line of reset relay RU. Relay RU cannot be energized at this time because a switch R2–4 of cup-at-press relay R2 is open; it also closes a switch RL–2 which is in series with RA–5, now closed, of cup-forward relay R1. Relay R1, however, because other switches in series are open, these being LS6, LS5–1, TR1–3 and R4–3. It also closes RL–3 of the cup-at-press relay R2, but relay R2 cannot be energized because the cup-at-press limit switch LS4 is open and press-run relay switch R4—4 is open.

It also closes switch RL–4 in series with lock switch R4–1 of press-run relay R4 to allow R4 to lock itself in on foot switch S2, which is being held down by the attendant and LS1, which is held closed as long as the cup is at the chute. Switch RL–5 is opened.

It is not necessary to follow the action of the memory-reset circuit further since it is an appurtenance of the press and is needed because the press is of a type which requires two strokes—down and back twice at each operating cycle—and this safety circuit is needed to prevent operation of the billet feed mechanism when the ram is in the off position on the first stroke.

It is thus seen that the invention provides simple and convenient means for feeding hot billets from a furnace chute to a press container and for assuring that all parts cooperate properly without injury or breakage.

While one embodiment of the invention has been described for purposes of illustration, it is to be understood that there may be various embodiments and modifications within the general scope of the invention.

We claim:

1. Apparatus for feeding billets from a supply chute to a press container, comprising in combination, a chute adapted to carry a line of billets, a movable bottom closure at the bottom of said chute for holding up the line of billets, clamp means for holding upper billets when lower billets are to be fed out from the bottom, a travelling billet receptacle having open upper and lower ends adapted to receive a billet from said chute, in its upper end when disposed therebelow, a movable bottom closure for said receptacle, means for moving said receptacle from a receiving position beneath said chute to a delivery position away from said chute, means for opening said chute closure to deliver a billet to said receptacle when disposed beneath the chute, and means at said delivery position for opening said receptacle closure to drop out a billet into the container.

2. Apparatus for feeding billets as set forth in claim 1, further characterized by the fact that said receptacle closure-opening means at the container comprises means which engages the receptable closure when the receptable is moved to said container.

3. Apparatus for feeding billets as set forth in claim 1, further characterized by the fact that said chute closure-opening means at the chute comprises interengaging means between said chute closure and means moving with said receptacle.

4. Apparatus for feeding billets as set forth in claim 1, further characterized by the fact that said receptacle closure-opening means at the container comprises a part at the container engaged by said receptacle closure in its travel with the receptacle; and that said chute closure-opening means at the chute comprises a part moving with said receptacle which engages a part carried by said chute closure.

5. Apparatus for feeding billets as set forth in claim 4, further characterized by the fact that both of said closures are hinged above billet-supporting elements and are biased to a normal position below the bottom of a billet.

6. Apparatus for feeding billets as set forth in claim 1, which further includes means for opening said receptacle closure when said receptacle is disposed beneath said chute.

7. Apparatus for feeding billets as set forth in claim 6, further characterized by the fact that said chute closure-opening means holds said chute closure open while said receptacle is disposed beneath said chute.

8. Apparatus for feeding billets as set forth in claim 7, which further includes means for maintaining said clamp means in holding relationship to the line of billets in the chute until said receptacle has moved away from the chute and the chute closure has re-closed.

9. Apparatus for feeding billets as set forth in claim 1, further characterized by the fact that means are provided for preventing the operation of the press until the receptacle has moved away from said press container.

10. Apparatus for feeding billets as set forth in claim 1, further characterized by the fact that said chute closure is hinged above the chute bottom and biased to a closed position to support billets thereon; that said receptacle is provided with coacting parts to open said chute closure when the receptacle moves to its home position beneath said chute; that said receptacle closure is hinged above the receptacle bottom and biased to a closed position to support billets thereon; that said container is provided with coacting parts to open said receptacle closure when the receptacle moves to the outer position at the press container; that means are provided for opening said receptacle closure when the receptacle is in its home position beneath said chute; that a carriage is mounted on a trackway for traversing movement of said receptacle between said chute and press container; that harmonic power means are provided for moving said carriage on an outstroke from its home position at the chute to its outward position at the press container and return; that means are provided for adjusting said trackway for varying the elevation of said receptacle at said press container; that means are provided for adjusting the position of the bottom end of said chute vertically and laterally relative to the home position of said receptacle; that means are provided for preventing said receptacle from being fed out if the press ram is not in its fully retracted position and deenergized; that means are provided for preventing the press from operating unless the receptacle has moved back from the press container by a predetermined distance; and that means are provided for maintaining said clamp means in holding engagement with the line of billets in the chute until said receptacle has moved away from the chute and the chute closure has closed ready to receive a billet thereon.

References Cited

UNITED STATES PATENTS

| | | | |
|---|---|---|---|
| 230,638 | 8/1880 | King | 113—113 |
| 2,538,413 | 1/1951 | Chard | 222—355 X |
| 2,564,139 | 8/1951 | Ward et al. | 221—293 |
| 2,611,911 | 9/1952 | Graham et al. | 221—298 |
| 2,658,199 | 11/1953 | Ayers | 221—293 |
| 2,687,233 | 8/1954 | Wenckus | 72—420 X |
| 3,105,610 | 10/1963 | Aidlin et al. | 221—298 X |

CHARLES W. LANHAM, *Primary Examiner.*

E. SUTTON, *Assistant Examiner.*